July 23, 1935.  R. P. ADAMS  2,009,352
FILTER
Filed Feb. 8, 1935
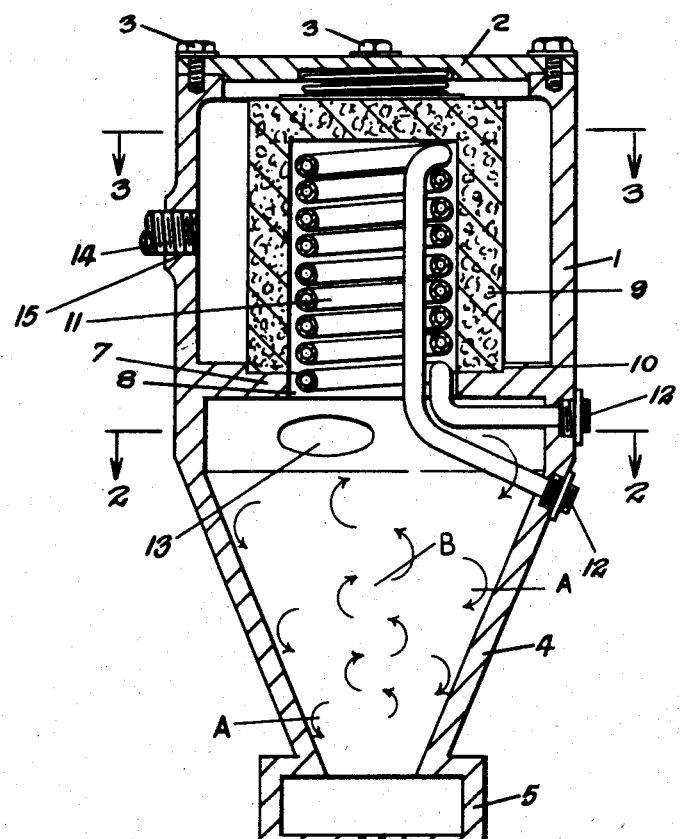
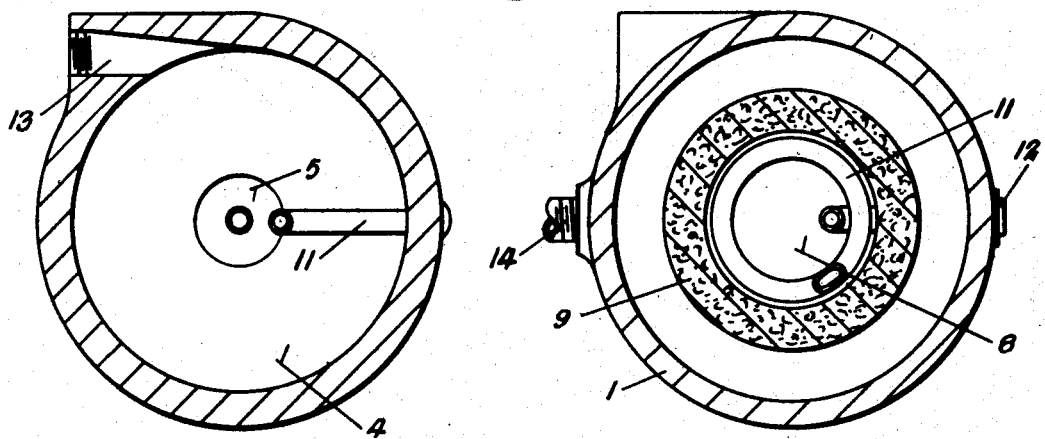
Inventor
Renard P. Adams Patented July 23, 1935

2,009,352

UNITED STATES PATENT OFFICE 2,009,352

FILTER

Renard Paul Adams, Buffalo, N. Y.

Application February 8, 1935, Serial No. 5,608

7 Claims. (Cl. 183—84)

My invention relates to improvements in fluid filters and is particularly designed for filtering air or gas, and the object of my invention is to provide a device of this type which will remove oil, water and condensable gases from air or gas filtered therethrough.

A further and particular object of my invention is to provide a filter which is a combination of a cyclone system and a stone filter element, together with a suitable cooling medium for producing condensation.

Another object of my invention is to form the stone filter of pot shape, and to so position it within its casing that it can be readily removed for cleansing purposes.

My invention consists of a filter constructed and arranged, all as hereinafter more particularly described and illustrated in the accompanying drawing in which:—

Figure 1 is a vertical cross-sectional view through my filtering device.

Figure 2 is a horizontal cross-sectional view taken through the line 2—2 Figure 1, and Figure 3 is a horizontal cross-sectional view taken through the line 3—3 Figure 1.

Like characters of reference indicate corresponding parts in the different views in the drawing.

The device comprises a cylindrical upper shell 1, open at its upper end and normally covered with a closure plate 2 which is retained by a plurality of screws 3 which pass through the plate and are threaded into the shell 1. The lower end of the shell portion 1 is continued downwardly to form a cyclone filter chamber 4 of inverted frusto conical form which opens at its lower end into a liquid receiving chamber 5, furnished with a draw-off pet cock 6. The lower end of the shell 1 is divided from the chamber 4 by a horizontal partition 7, having a central orifice 8 therein.

The shell 1 is designed to contain an inverted filter pot 9, which is inserted by the removal of the closure plate 2. The upper face of the partition 7 is formed with a circular recess 10 around the orifice 8, and of substantially the same diameter as the outer diameter of the filter pot 9, whereby the bottom of the pot is contained within the recess. The filter pot is formed of porous stone material held together with a suitable binder, and permits the passage of air or gas therethrough, but absorbs any condensate of oil or water. Interiorly of the filter pot, I furnish a cooling pipe coil 11, which has its inlet and outlet ends extending through the wall of the chamber 4, and provided with the usual connection nipples 12. The cooling coil contains a circulating liquid, such as water, which is of a temperature lower than that of the air or gas being filtered.

The entrance to the filter is formed through a nozzle 13, which opens into the upper portion of the chamber 4, substantially tangentially thereto, as illustrated in Figure 2. The outlet from the filter is provided by a pipe 14, connected to an orifice 15 in the shell 1. The filter pot is held securely in place by a spiral compression spring interposed between the top of the pot and the lower face of the closure plate 2.

The operation of my device is as follows:—

When the gaseous fluid to be filtered enters the chamber 4 through the nozzle 13, the nozzle through its taper produces an increased velocity, and through the conical shape of the chamber, the fluid is caused to circulate downwardly as indicated by the arrows A, in what is known as a cyclone. As the whirling fluid reaches the centre of the chamber in its gradually narrowing circular path, it changes its direction and spirals upwardly through the centre of the chamber as indicated by the arrows B, and through the opening 8 into the centre of the filter pot 9. As the whirling fluid moves towards the axis of the chamber 4 and commences to spiral upwardly, condensate or liquid contained within the fluid is thrown off and collects upon the lower inner face of the wall of the chamber 4, from where it runs into the liquid receiving chamber 5. The design of the cyclone separating chamber 4 is such as to produce an angular velocity in the inner spiral B of approximately eight times that in the outer downward spiral A. Liquid not ejected through the effect of the downward spiral path of the fluid, is thrown off by the inner spiral rotation of the fluid during its passage upwardly towards the orifice 8 into the filter stone.

After the liquid condensate is eliminated from the fluid swirling in the chamber 4, such swirling fluid passes upwardly through the orifice 8 into the centre of the filter pot 9, wherein it passes over the cooling coil 11. As this coil is retained at a lower temperature than the fluid being filtered, the contact with the coil causes further condensation of any condensable gases and any contained oil or water vapour. The fluid with its condensates, passes through the walls of the filter pot, and as the material structure of the filter pot is such that it absorbs the condensates and only permits the passage therethrough of air or gas, a thoroughly filtered gaseous fluid will be obtained within the shell 1, outside the filter pot and drawn off through the pipe 14.

The filter pot will continue to absorb condensates until it becomes saturated, and when this condition exists, the pot can be readily taken out of the filter by the removal of the closure plate 2 and replaced by another filter, or immediately cleaned with gasoline or some other solvent.

From the foregoing description it will be apparent that I have constructed a very simple and yet efficient gaseous fluid filter, in which the filtering element can be removed for cleaning or replacement without disturbing the inlet or outlet pipe connections of the filter, and furthermore, through the provision of the cyclone portion of my device, I have provided a means for removing a large proportion of filterable matter before passage to the filter pot, and although I have shown and described a particular embodiment of my invention, it is to be understood that I can make such changes and alterations as I may, from time to time, deem necessary without departing from the spirit of my invention as set forth in the appended claims.

What I claim as my invention is:—

1. A fluid filter of the character described, comprising an upper chamber, a lower fluid receiving chamber opening into the upper chamber, a fluid inlet to the filter opening into the lower chamber, a fluid exit opening from the upper chamber, a porous fluid filtering element positioned across the opening between the chambers and through which the fluid passes, and a fluid cooling element so positioned in respect to the porous element, that the fluid in its passage from the lower chamber into the porous element passes over the fluid cooling element.

2. A fluid-filter of the character described, comprising an upper chamber, a lower fluid receiving and fluid swirling chamber opening into the upper chamber, a fluid inlet to the filter opening into the lower chamber a fluid exit opening from the upper chamber, a porous fluid filtering element positioned across the opening between the chambers and through which the fluid passes, and a fluid cooling coil positioned below the porous element whereby the fluid in its passage passes over the coil before entering the porous element.

3. A fluid filter of the character described, comprising an upper chamber, a lower fluid receiving and fluid swirling chamber of substantially inverted conical form opening into the upper chamber, a fluid inlet opening in a substantially tangential direction into the fluid swirling chamber a fluid exit opening from the upper chamber, a porous fluid filtering element positioned across the opening between the chambers and through which the fluid passes, and a fluid cooling element so positioned in respect to the porous element that the fluid in its passage from the lower chamber into the porous element passes over the fluid cooling element.

4. A fluid filter of the character described, comprising an upper chamber, a fluid exit opening from the upper chamber, a lower fluid receiving chamber opening into the upper chamber, an inverted filter pot of porous stone-like material contained within the upper chamber and covering the opening between the chambers, and a fluid cooling coil contained within the filter pot.

5. A fluid filter of the character described, comprising an upper chamber, a fluid exit opening from the upper chamber, a lower fluid receiving and swirling chamber of substantially inverted conical form opening into the upper chamber, a fluid inlet opening in a substantially tangential direction into the fluid swirling chamber an inverted filter pot of porous stone-like material contained within the upper chamber and covering the opening between the two chambers, and a fluid cooling element positioned within the opening underneath the filter pot.

6. A fluid filter of the character described, comprising an upper chamber, a fluid exit opening from the upper chamber, a lower fluid receiving and swirling chamber of substantially inverted conical form opening into the upper chamber, an inverted filter pot of porous material contained within the upper chamber and covering the opening between the two chambers, and a fluid cooling coil extending upwardly from the lower chamber into the filter pot.

7. A fluid filter of the character described, comprising an upper chamber, a removable closure plate for the top of the chamber, a lower fluid receiving and swirling chamber of substantially inverted conical form opening into the upper chamber, an inverted filter pot of porous material removably positioned within the upper chamber through the closure plate covered open top and positioned to cover the opening between the two chambers, and a fluid cooling coil extending upwardly from the lower chamber into the filter pot.

RENARD PAUL ADAMS.